United States Patent Office 3,277,065
Patented Oct. 4, 1966

3,277,065
METHOD FOR PREPARATION OF PREPOLYMERS FROM ALLYLIC MONOMERS
John C. Petropoulos, Norwalk, and John K. Gillham, Stamford, Conn., assignors to Formica Corporation, Cincinnati, Ohio, a corporation of Delaware
No Drawing. Filed Oct. 5, 1962, Ser. No. 228,727
7 Claims. (Cl. 260—88.3)

This invention relates to a novel process for the production of prepolymers from free-radical polymerizable monomers. More particularly, this invention relates to a novel process for the production of prepolymers from free-radical polymerizable monomers which are not capable of significant thermal polymerization. Still more particularly, this invention relates to a novel process for the production of prepolymers which comprises heating a mixture of a free-radical polymerization catalyst and a free-radical polymerizable monomer above the decomposition temperature of said catalyst, the amount of said catalyst present being only that necessary to produce a prepolymer of the specific monomer being treated.

Various methods for the production of prepolymers of many types of materials are well known in the art. Most of theses processes, however, are undesirable for one reason or another and therefore have not been able to be developed to a great extent for commercial purposes. Some of the prior art processes are very commercially unattractive in regard to their very difficult prepolymer recovery steps while others are equally disregarded because they require a very tedious and unreliable monitor of the viscosity increase during polymerization. Additionally, many of the previous methods employ such materials as chain-length regulators and polymerization inhibitors to stop the reaction. These methods, however, are very unpredictable and further complicate the problems in that the inhibitor or regulator generally must thereafter be removed or its activity negated in some way, in order to initiate polymerization again to produce the desired product. Another deterring factor, in the prior art prepolymer production processes lies in the length of time consumed to poduce said prepolymers. Oftimes it is necessary to conduct the process for over 2 hours, and even up to 8 hours, before a prepolymer can be recovered.

We have now found a novel process wherein stable prepolymers may be produced without the necessity of employing complicated and time-consuming recovery and extraction procedures. Additionally, no monitor of the viscosity increase of the polymer is necessary and no extraneous ingredients need be added to the system to stop the reaction. Obviously therefore, the time necessary to remove or negate the activity of these extraneous additives has been saved. Another feature of our process is the fact that the entire production of the prepolymer is completed in a relatively short length of time, i.e. as little as 10 to 15 minutes may be sufficient in many cases.

The term "prepolymer," as used herein, is meant to describe low molecular weight thermoplastic polymerization products containing residual unsaturation and which are capable of further polymerization to thermoset structures. The prepolymers are used for molding, to produce laminates or coatings and in many other fields wherein thermosetting resins are applicable. The prepolymers produced by the novel process disclosed herein may be in the form of free-flowing powders or as very viscous solutions of the polymer in unreacted monomer. The desired end use of the prepolymer generally governs the form of the prepolymer produced. That is to say, when the prepolymer is to be used for molding it is generally preferable to use it in the form of a powder, while those to be used to produce laminates are generally in the form of a viscous liquid.

It is therefore an object of the present invention to present a novel process for the production of prepolymers from free-radical polymerizable monomers.

It is a further object of the present invention to present a novel process for the production of stable prepolymers of free-radical polymerizable monomers which is characterized by its ease of operation, its relatively rapid production of prepolymers, its predictability and its ease of control.

These and further objects of the present invention will become more apparent to those skilled in the art upon reading the more detailed description set forth hereinbelow.

Our novel prepolymer production process comprises heating a mixture of a free-radical polymerizable monomer and a free-radical generating catalyst which will decompose substantially immediately above a specific temperature and will not decompose explosively at said temperature, to a temperature above said decomposition temperature. The result of this heating is that the free-radical catalyst present generates substantially all of its free radicals in a relatively short length of time, thereby forming a prepolymer of the monomeric material. The amount of catalyst present, of course, is less than the amount necessary to produce a solid, thermoset polymer by releasing all its available free radicals.

The monomer capable of being treated by our novel process must be incapable of substantial thermal polymerization and must contain at least one allyl or alkallyl group as the only point of unsaturation at which polymerization can occur. Additionally, the monomers must be polymerizable by free-radical polymerization means. Examples of monomers which are applicable for use in the process of the present invention are the compounds having the formula (I) 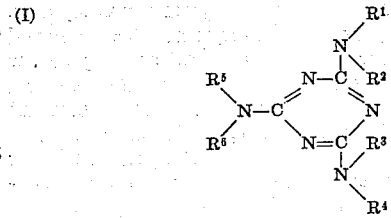

wherein $R^1$, $R^2$, $R^3$, $R^4$, $R^5$ and $R^6$ are alkyl radicals of 1 to 10 carbon atoms, inclusive, aryl radicals of 6 to 10 carbon atoms, inclusive, alkene radicals of 3 to 4 carbon atoms, inclusive, alkaryl radicals, aralkyl radicals or cycloalkyl radicals, and not more than one of the pairs of radicals $R^1$ and $R^2$, $R^3$ and $R^4$, $R^5$ and $R^6$, together with the non-ring nitrogen atom, represent a 6 to 9 membered alkylenimino radical and wherein at least three of the $R^1$ to $R^6$ groups are allyl radicals.

Compounds which are included in this formula include:
2,4-bis(diallylamino)-6-piperidino-s-triazine;
2-diallylamino-4-allylmethylamino-6-piperidino-s-triazine;
2-diallylamino-4-allylheptylamino-6-piperidino-s-triazine;
2-diallylamino-4-allyldecylamino-6-piperidino-s-triazine;
2-diallylamino-4-allylbenzylamino-6-piperidino-s-triazine;
2-diallylamino-4-allylphenylamino-6-piperidino-s-triazine;
2-diallylamino-4-allyltolylamino-6-piperidino-s-triazine;
2-allylamino-4-allylxylylamino-6-piperidino-s-triazine; etc.

Compounds which are represented by Formula I, above, include hexallylmelamine;
2-diallylamino-4-dimethylamino-6-allylmethylamino-s-triazine;
2-diallylamino-4-diamylamino-6-allylamylamino-s-triazine;
2-diallylamino-4-didecylamino-6-allyldecylamino-s-triazine;
2-diallylamino-4-diphenylamino-6-allylphenylamino-s-triazine;
2-diallylamino-4-dibenzylamino-6-allylbenzylamino-s-triazine;
2-diallylamino-4-ditolylamino-6-allyltolylamino-s-triazine;
2-diallylamino-4-dixylylamino-6-allylxylylamino-s-triazine;
2-diallylamino-4-di-n-butylamino-6-allyl-n-butylamino-s-triazine;
2-diallylamino-4-methylpentylamino-6-allylmethylamino-s-triazine;
2-diallylamino-4-octylphenylamino-6-allyltolylamino-s-triazine;
2,4-bis(diallylamino)-6-allylmethylamino-s-triazine;
2,4-bis(diallylamino)-6-allyldecylamino-s-triazine;
2,4-bis(diallylamino)-6-allylphenylamino-s-triazine;
2,4-bis(diallylamino)-6-dimethylamino-s-triazine;
2,4-bis(diallylamino)-6-dioctylamino-s-triazine;
2,4-bis(diallylamino)-6-diphenylamino-s-triazine;
2,4-bis(diallylamino)-6-dibenzylamino-s-triazine;
2,4-bis(diallylamino)-6-di(2-ethylhexylamino)-s-triazine;
2,4,6-tris(allylmethylamino)-s-triazine;
2,4,6-tris(allylphenylamino)-s-triazine; and the like.

These monomers may be produced by procedures disclosed, for example, in U.S. Patent No. 2,566,226 and an article by Pearlman et al., "Journal of the American Chemical Society," vol. 70, pp. 3726–3728, and by any other procedures known to those skilled in the art.

The above enumerated compounds may be treated by our novel process alone or in admixture with one another to produce homopolymeric or copolymeric prepolymers.

Any free-radical generating catalyst may be employed in the process of the present invention as long as the catalyst will decompose substantially immediately above a specific temperature (but not explosively) to generate all its free-radicals. That is to say, the number of free radicals are generated by the catalyst upon heating it quickly above its decomposition temperature must be substantially the same as would be generated by the same catalyst over a longer period of time and at a lower temperature. An example of a catalyst which fits this description is 2,5-dimethyl-2,5-di(t-butylperoxy)-n-hexane.

In order to determine the approximate amount of catalyst to employ in the polymerization of any given monomer to a desired form of prepolymer, it is first necessary to conduct a series of polymerizations of the monomer utilizing varying amount of catalyst in each polymerization. In this way the amount of catalyst necessary to produce the desired type of prepolymer for a given monomer can be determined. We have found that the catalyst will then react on a larger scale, in the same manner as it did in the experimental (small) scale. The determination is usually carried out simultaneously on a series (i.e. up to about 10) of monomer-catalyst mixtures, each containing increasingly larger amounts of catalyst, by heating each mixture to a temperature above that at which the catalyst decomposes.

In this manner, the catalyst concentration for a specific monomer is determined and on a larger scale the exact form of prepolymer of said monomer needed can be produced. The prepolymer may be in the form of a viscous liquid which may be used as such immediately or may be stored until needed. The prepolymer may also be in the form of a gel which can be transformed into a free-flowing powder useful for molding by removing the unreacted monomer therefrom in a manner shown in the art, see especially U.S. 3,030,341.

The prepolymers, as such, contain residual unsaturation and by adding more catalyst thereto and heating, various thermoset products can be manufactured therefrom such as laminates, moldings, films, foils, fibers and the like. Generally, from about 0.5% to about 5.0%, by weight, of the catalyst must be present in the prepolymer in order to subsequently fully polymerize it.

The prepolymers may be used as produced or they may be compounded with various additives such as dyes, pigments, fibers, lubricants and the like, depending upon their ultimate application, without detracting from the advantageous properties and results mentioned hereinabove.

The following examples are set forth for purposes of illustration only and are not to be construed as limitations on the present invention except as set forth in the appended claims. All parts and percentages are by weight unless otherwise indicated.

EXAMPLE 1

Five mixtures of 2,4-bis(diallylamino)-6-piperidino-s-triazine and 2,5-dimethyl-2,5-di(t-butylperoxy)-n-hexane, as a catalyst, are prepared, each containing a different amount of the catalyst. The samples are degassed and sealed in vacuo. The five samples are simultaneously plunged into an oil bath held at 150° C. The results of the heating procedures are given in Table I below.

*Table I*

| Sample | Cat. conc., pts./vol. | Appearance After— | | |
|---|---|---|---|---|
| | | 25 min. | 55 min. | 64 hrs. |
| 1 | 1/1,000 | L | L | L |
| 2 | 2/1,000 | L | L | L |
| 3 | 4/1,000 | L | VV | R |
| 4 | 8/1,000 | L | S | HS |
| 5 | 16/1,000 | L | S | HS |

L = Liquid; VV = Very viscous; R = Rubber; S = Solid; HS = Hard solid.

From this table it can be seen that prepolymers are produced when 2,4-bis(diallylamino)-6-piperidino-s-triazine is heated at 150° C. utilizing at least 0.004 part by volume of the catalyst.

EXAMPLE 2

Utilizing the information received from the determination set out in Example 1, a batch of 250 parts by volume of 2,4-bis(diallylamino)-6-piperidino-s-triazine and one part by volume of 2,5-dimethyl-2,5-di(t-butylperoxy)-n-hexane is charged to a suitable creased reaction vessel equipped with a nitrogen inlet and stirrer. Nitrogen is bubbled through the reaction mixture and the reaction mixture is then heated to 150° C. A mild exotherm occurs and the reaction mixture is allowed to cool back to 150° C. and is held for 45 minutes. The reaction mixture is then allowed to cool to room temperature. A highly viscous liquid prepolymer is recovered.

Viscosity of monomer at room temperature—Gardner-Holdt, F.

Viscosity of viscous liquid prepolymer at room temperature—Gardner-Holdt, Z–2.

EXAMPLE 3

100 parts of the viscous liquid prepolymer prepared in Example 2 and 1.6 parts of 2,5-dimethyl-2,5-di(t-butylperoxy)-n-hexane are agitated together under a nitrogen atmosphere. A glass cloth is placed on a sheet of cellulosic film and the prepolymer-catalyst mixture is then worked into said cloth. Another glass cloth is placed upon the first cloth and more prepolymer mixture is then added. This procedure is continually followed until twelve layers of cloth have been added. Air bubbles are pressed out of the structure and a cellulosic film is then wrapped around the air-free form. The wrapped form is placed between two stainless steel plates and a pressure of 10 p.s.i. is then applied to the structure in a press at 130° C. for 72 hours. A glass-reinforced laminate is recovered.

EXAMPLE 4

The procedure of Example 1 is again followed except that five mixtures of hexaallyl melamine and the specified catalyst are employed in similar concentrations. Upon heating the samples to 150° C. it is found that a satisfactory prepolymer of a very viscous consistency is formed utilizing at least 0.003 part of catalyst.

EXAMPLE 5

The procedure of Example 2 is again followed utilizing the information gained from Example 4 and a mixture of 333 parts of hexaallyl melamine and one part of 2,5-dimethyl-2,5-di(t-butylperoxy)-n-hexane is employed. After the mixture is heated to 150° C. and allowed to cool, a highly viscous liquid prepolymer is recovered.

EXAMPLE 6

To 100 parts of the viscous prepolymer of Example 5, are added 1.7 additional parts of 2,5-dimethyl-2,5-di(t-butylperoxy)-n-hexane and a laminate is produced as disclosed in Example 3. Again a strong, well-bonded, glass-reinforced laminate is recovered.

The following table sets forth the results obtained utilizing various other s-triazine compounds in the prepolymer and laminate production procedures set forth in Examples 1 to 3.

Table II

| Monomer | First Catalyst Addition, pts./vol. | Prepolymer Condition | Second Catalyst Addition, pts./vol. | Laminate |
|---|---|---|---|---|
| A | 0.004 | Slightly Solid | 1.6 | Yes, Well-bonded. |
| B | 0.005 | Very viscous liquid. | 1.5 | Do. |
| C | 0.0025 | Viscous liquid | 1.75 | Do. |

A=2,4-bis(diallylamino)-6-dipropylamino-s-triazine.
B=2,4-bis(diallylamino)-6-diphenylamino-s-triazine.
C=2,4-bis(diallylamino)-6-di(2-ethylhexylamino)-s-triazine.

We claim:
1. A process for the production of a stable prepolymer which comprises heating, to a temperature of at least about 130° C., a mixture of (a) a free-radical polymerizable N-substituted melamine material which contains at least one allyl group as the only point of unsaturation at which polymerization can occur, and which will not significantly polymerize thermally and (b) a free-radical generating catalyst comprising 2,5-dimethyl-2,5-di(t-butylperoxy)-n-hexane, the amount of said catalyst being at least 0.003 part by volume, and that which will only initiate the degree of polymerization of the monomer as determined by pre-experimentation on small quantities of said monomer, the number of free radicals generated by the decomposing catalyst at said temperature being substantially the same as would be produced over a longer period of time at a lower temperature.

2. A process for the production of a stable prepolymer which comprises heating, to a temperature of at least about 130° C., a mixture of (a) a monomer having the formula

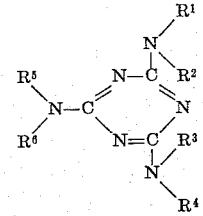

wherein $R^1$, $R^2$, $R^3$, $R^4$, $R^5$ and $R^6$ are alkyl radicals of 1 to 10 carbon atoms, inclusive, aryl radicals of 6 to 10 carbon atoms, inclusive, alkene radicals of 3 to 4 carbon atoms, inclusive, alkaryl radicals, aralkyl radicals or cycloalkyl radicals, and not more than one of the pairs of radicals $R^1$ and $R^2$, $R^3$ and $R^4$, $R^5$ and $R^6$, together with the non-ring nitrogen atom, represent a 6 to 9 membered alkylenimino radical and wherein at least three of the $R^1$ to $R^6$ groups are allyl radicals and (b) a free-radical generating catalyst comprising 2,5-dimethyl-2,5-di(t-butylperoxy)-n-hexane, the amount of said catalyst being at least 0.003 part by volume, and that which will only initiate the degree of polymerization of the monomer as determined by pre-experimentation on small quantities of said monomer, the number of free-radicals generated by the decomposing catalyst at said temperature being substantially the same as would be produced over a longer period of time at a lower temperature.

3. A method according to claim 2 wherein the monomer is 2,4-bis(diallylamino)-6-piperidino-s-triazine.

4. A method according to claim 2 wherein the monomer is hexaallyl melamine.

5. A method according to claim 2 wherein the monomer is 2,4-bis(diallylamino)-6-dipropylamino-s-triazine.

6. A method according to claim 2 wherein the monomer is 2,4-bis(diallylamino)-6-diphenylamino-s-triazine.

7. A method according to claim 2 wherein the monomer is 2,4-bis(diallylamino) - 6-di(2-ethylhexylamino)-s-triazine.

References Cited by the Examiner
UNITED STATES PATENTS

| | | | |
|---|---|---|---|
| 2,566,226 | 8/1951 | Mackay et al. | 260—249.6 |
| 2,861,901 | 11/1958 | Reeves et al. | 260—88.3 |
| 3,030,341 | 4/1962 | Willard | 260—95 |
| 3,209,055 | 9/1965 | Hedberg et al. | 260—96 |

JOSEPH L. SCHOFER, Primary Examiner.

LEON J. BERCOVITZ, Examiner.

C. R. REAP, H. I. CANTOR, Assistant Examiners.